United States Patent [19]

Pyne

[11] Patent Number: 5,721,907
[45] Date of Patent: Feb. 24, 1998

[54] REMOTE FILE TRANSFER METHOD AND APPARATUS

[75] Inventor: Charles F. Pyne, Norfolk, Mass.

[73] Assignee: Traveling Software, Inc., Bothell, Wash.

[21] Appl. No.: 445,781

[22] Filed: May 22, 1995

Related U.S. Application Data

[63] Continuation of Ser. No. 182,969, Jan. 14, 1994, Pat. No. 5,446,888.
[51] Int. Cl.$^6$ .................................................. G06F 13/00
[52] U.S. Cl. ............................................ 395/610; 395/617
[58] Field of Search ....................................... 395/600, 575

[56] References Cited

U.S. PATENT DOCUMENTS

| | | | |
|---|---|---|---|
| 4,641,274 | 2/1987 | Swank | 364/900 |
| 4,807,182 | 2/1989 | Queen | 364/900 |
| 5,210,865 | 5/1993 | Davis et al. | 395/525 |
| 5,479,654 | 12/1995 | Squibb | 395/600 |

*Primary Examiner*—Jack B. Harvey
*Assistant Examiner*—David A. Wiley
*Attorney, Agent, or Firm*—Stoel Rives LLP

[57] ABSTRACT

Remote file transfer applications often involve a situation where a receiving computer (22) contains a reference file (48) that may be similar, or perhaps even identical to, a source file (46) to be transmitted by a sending computer (20). Disclosed is a file transfer method that identifies and isolates the differences between the two files, and transmits only those differences to the receiving computer. The method divides the data in the reference file into a plurality of blocks and associates each block of data with a key value. The key values are then sent to the sending computer in the form of an array. At the sending computer, a block of data at the source file is identified, its key value computed, and the key value is then compared to the keys in the array. If a match is found, an indication of such is sent to the receiving computer. Otherwise, a byte of data from the data block is sent to the receiving computer, and a subsequent block of data is identified and analyzed. The latter steps of the method are repeated until a representation of the source file is present at the receiving computer.

32 Claims, 8 Drawing Sheets

REMOTE FILE TRANSFER METHOD AND APPARATUS

This is a continuation of application Ser. No. 08/182,969, filed Jan. 14, 1994 now U.S. Pat. No. 5,446,888.

FIELD OF THE INVENTION

The present invention relates to computer communications in general and, in particular, to a method and apparatus for decreasing the time required to update files located at a remote computer.

BACKGROUND OF THE INVENTION

In computer communications technology, the rate of data communication between a computer and other peripheral devices is very important. The ability to quickly and accurately transfer data between two personal computers is of special interest in light of the increased use of portable computers. Often, data entered into a portable computer is ultimately transferred to a user's home or office personal computer. Computer specialists are continually searching for communication protocols that decrease the time required to transfer data without compromising the reliability of the data being transmitted.

A conventional method for conveying data between computers, especially personal computers, involves the interconnection of a data bus in a sending computer with a data bus in a receiving computer. This may be done by coupling the serial, parallel, or similar communications ports of each computer through an interface link, such as a cable or across a data path using modems. In serial communication, data is transferred one bit at a time. Serial communications work well for transferring data over long distances, and particularly with modems that couple two computers using a telephone line. However, the time required to transfer data using serial communications can be significant, especially for larger files. When communicating between two devices that are relatively close, parallel communications are often used. Parallel communication is the simultaneous transfer of a number of bits of data in parallel, e.g., 8-bit, using a multi-bit data path.

Computer software companies are continually investigating more efficient methods of transferring data to reduce data transmission times. Two prevalent areas of concentration have been on increasing data transfer rates and on incorporating forms of data compression to reduce the amount of data being sent. Advances in data transfer rates have been accomplished by increasing the speed at which modems communicate in serial communication and by increasing the number of bits that can be transferred simultaneously in parallel communication. An example technology that incorporates the latter technique is described in U.S. Pat. No. 5,261,060, titled "Eight-bit Parallel Communications Method and Apparatus," and assigned to the assignee of the present invention. U.S. Pat. No. 5,261,060 is hereby incorporated by reference. Data compression schemes reduce the size of a file to be transmitted by various means of compacting information. For example, one common compression technique, called key-word encoding, replaces words that occur frequently, e.g., the, with a 2-byte token representation of each word. After the compressed data is received by a remote computer, the data is decompressed to create a representation of the original contents of the file.

A more recent approach to decreasing the time required to transfer a file has recognized that a receiving computer will often have a file, i.e., a reference file, that is similar or perhaps even identical to a source file to be transmitted. For example, the source file may simply include text from the reference file with only a few words or sentences changed. Rather than sending an original or compressed representation of the entire source file, file transfer methods utilizing this approach identify the differences between the two files, and then transfer only the differences to thee receiving computer. Upon receipt, the difference information is used to update the reference file at the receiving computer, thereby reproducing a precise copy of the source file. The present invention is directed toward an improved method of identifying and transferring revisions between a source file and a reference file to create an accurate copy of the source file at a remote computer.

SUMMARY OF THE INVENTION

The invention is a file transfer method that identifies and isolates the differences between a source file located at a sending computer and a reference file, located at a receiving computer, that may have data similar to the data comprising the source file. The computers are connected through a computer data interface. The method includes the steps of: (a) dividing the reference file into a plurality of data blocks and associating each data block with a key value representative of the data in each block; and (b) identifying blocks of data at the source file and using the key values to compare blocks of data from the reference file to blocks of data from the source file and, in instances where a match is found between a block of data from each file, sending an indication of the match to the receiving computer so that the block of data indicated by the match need not be transmitted to the receiving computer.

In accordance with other aspects of the invention, the step of identifying blocks of data at the source file includes the step of computing a source key for each block of data which is then compared to the key values from the reference file.

In accordance with still further aspects of the invention, an initial block of data is identified from the source file and a source key is computed from the initial block. If a match for the initial block is not found, the method includes the steps of: (i) transmitting a byte of data from the initial block to the receiving computer; and (ii) identifying a subsequent block of data from the source file comprising the initial block of data, less the transmitted byte, and a byte of data from the source file.

In accordance with other aspects of the invention, the method includes the step of transmitting the key values associated with data blocks in the reference file to the sending computer. Further, the key value for a block of data is computed by multiplying the bytes in the block by one or more multipliers, the value of the multiplier being dependent upon the position of a given byte in the block, and summing the results of the multiplication operations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Remote file transfer applications often involve a situation where a receiving computer already contains a file that is similar, or perhaps even identical to, a file to be transmitted. For example, the file to be transmitted may be a revision of a text file with only a few words or sentences changed. The invention is a file transfer method that identifies and isolates the differences between the two files, and transmits only those differences to the receiving computer. For similar files, the file transfer method can result in compression ratios far in excess of those achieved by traditional data compression methods.

Figure 1:
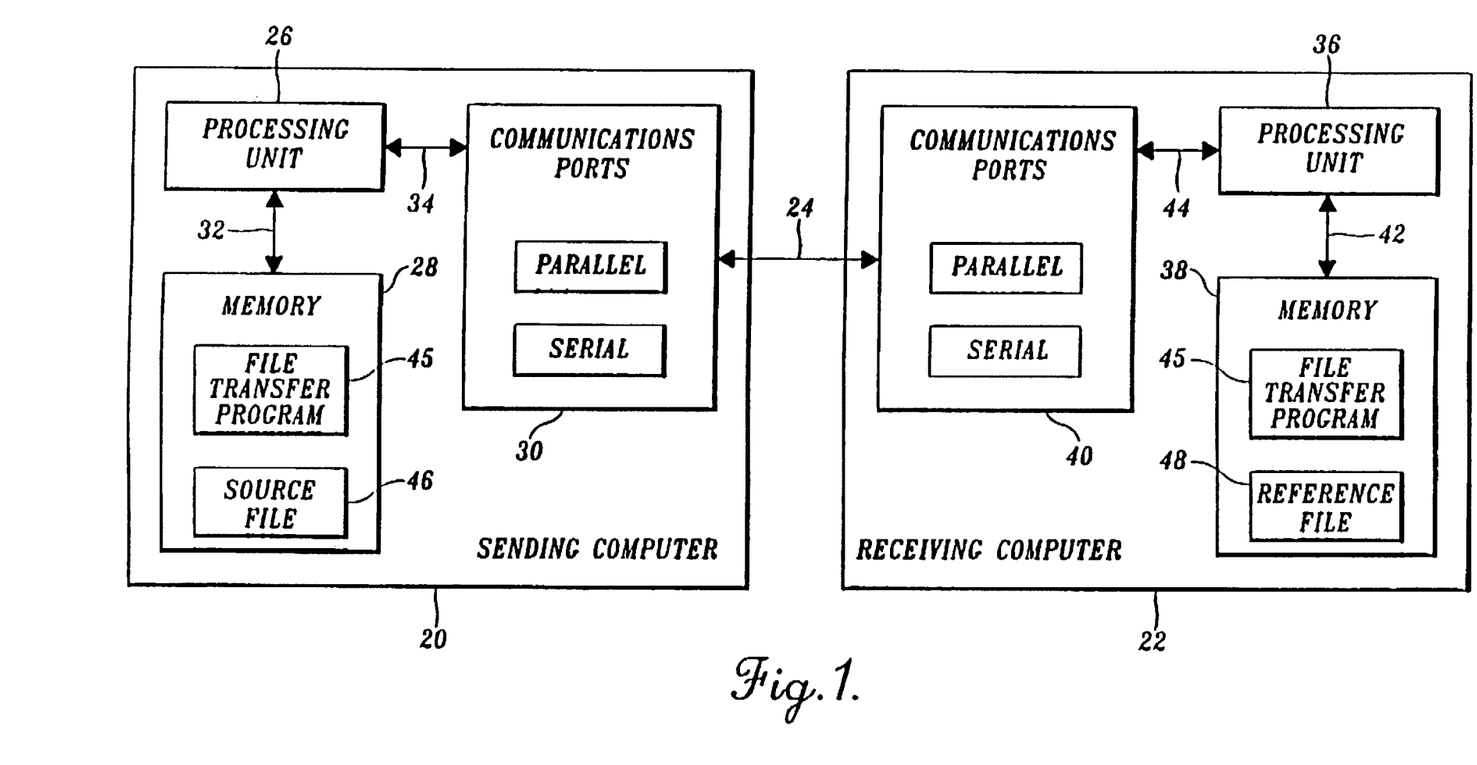
FIG. 1 is a block diagram of a communications network including a sending computer and a receiving computer, each running a file transfer program that may be used to update files in accordance with the invention.

FIG. 1 illustrates a typical operating environment in which the invention may be utilized. A sending computer 20 is coupled to a receiving computer 22 through a communications link 24. The computers are of a type generally known in the art, such as personal or laptop computers. The communications link may be any known means for transferring data between the two computers, such as the LAPLINK® series of file transfer tools manufactured and sold by Traveling Software, Inc., the assignee of the present invention.

The sending computer 20 generally comprises a processing unit 26, a memory 28, and a number of communications ports 30. The memory, including random access memory (RAM), read only memory (ROM), and external systems memory, is connected to the processing unit 26 by a data/address bus 32. The communications ports are connected to the processing unit by a data bus 34. The communications ports 30 include parallel and serial ports, as well as other input/output technologies including PCMCIA card technology, that allow data to be sent and received by the sending computer. The receiving computer 22 is similar to the sending computer, and includes a processing unit 36, memory 38, communications ports 40, data/address lines 42, and a data bus 44. Although for ease of description one computer is called the sending computer and the other is called the receiving computer, the computers are generally interchangeable.

In order to accomplish data transfer, the sending and the receiving computers include computer program controls that, for example, are stored in RAM and executed by the processing units of each computer. In one embodiment of the invention, the sending and receiving computer controls are combined into a single file transfer program 45 that is resident at each computer. In this manner, each computer can operate as a sending or receiving computer. Because of the requirements of handshaking, copies of the file transfer program 45 located at each computer are preferably executed simultaneously. This allows for full-duplex transmission, i.e., simultaneous communications in each direction. The invention may also be utilized in half-duplex communications, although not as efficiently.

For clarity in this discussion, throughout the Detailed Description it is assumed that a source file 46 located at the sending computer is to be sent to the receiving computer 22. Further, it is assumed that the receiving computer includes a reference file 48 that includes at least some similarities to the source file. Once a user indicates that a source file is to be transferred, a reference file that may have data that is similar to the source file is identified by, for example, having a file name that is the same or similar to the source file. The invention described herein generally assumes that a reference file has been identified. The basic steps implemented by the file transfer program are as follows:

(1) identifying a reference file at the receiving computer that may have data similar to data comprising the source file;

(2) dividing the data comprising the reference file into a plurality of data blocks having n-bytes per block and associating each data block with a key value;

(3) transmitting the key values from the receiving computer to the sending computer;

(4) identifying a current n-byte block of data from the source file and computing a value for a source key associated with the current block of data;

(5) comparing the value of the source key with each of the key values from the reference file and, if a match is found, (i) transmitting an indication of the match to the receiving computer, and (ii) repeating step (4); and (6) if a match was not found, transferring to the receiving computer a byte of data from the current block of data, adding an additional byte of data from the source file to the current block of data, re-computing the value of the source key, and repeating step (5).

Generally, the loops created by steps (5) and (6) repeat until all of the data in the source file has been considered. At the receiving computer, a destination file is created from the match indications and the byte transmissions. The destination file will be a duplicate of the source file upon completion of transmission.

Figures 2, 3:
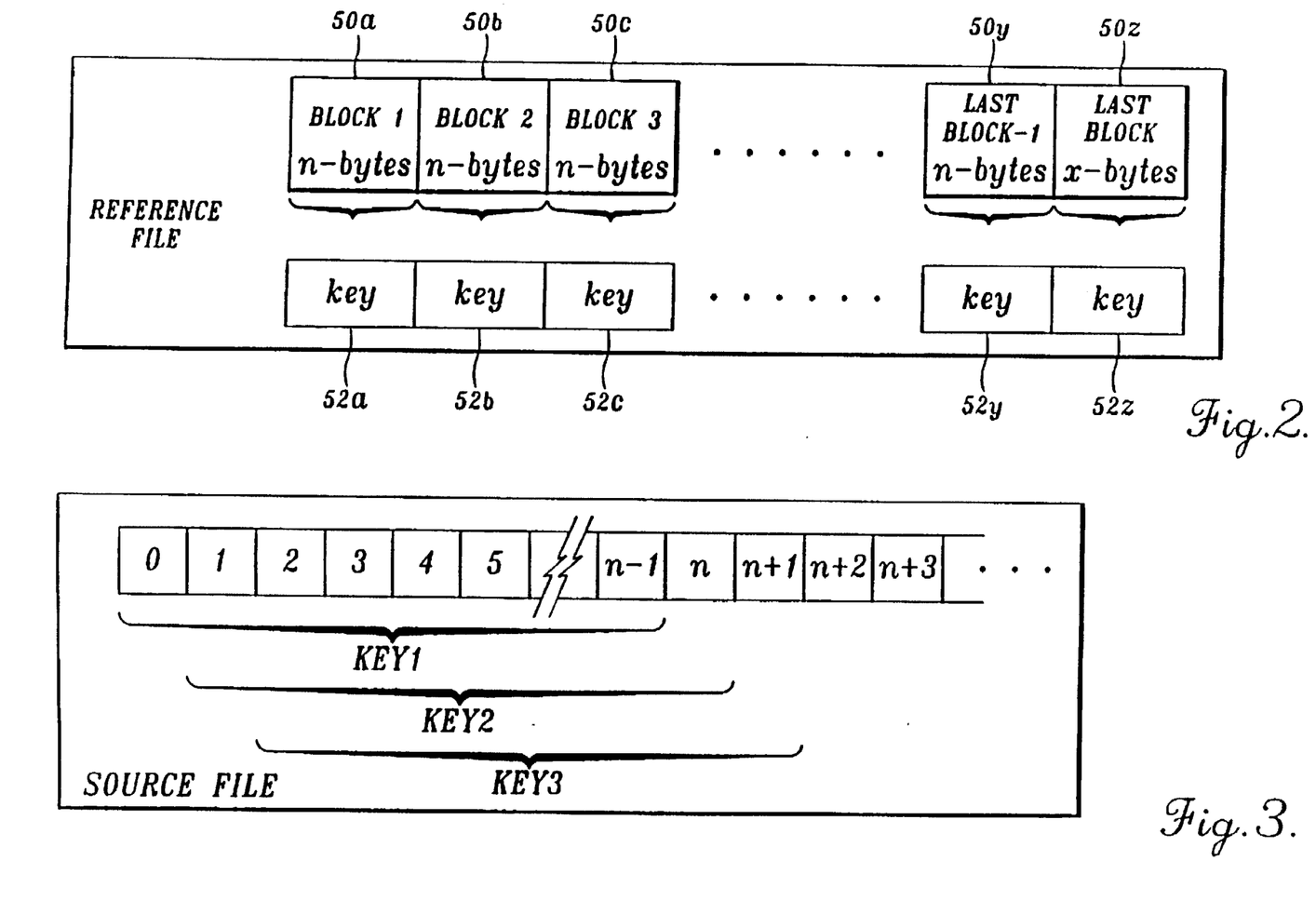
FIG. 2 is a block diagram depicting the representation of a reference file, that may have similarities to a source file to be transmitted, using a number of keys, with each key being associated with and representative of a block of data in the reference file.
FIG. 3 is a block diagram illustrating the selection of blocks of data at the source file on a sliding window basis.

FIG. 2 illustrates pictorially step (2), which includes dividing the data comprising the reference file into a plurality of data blocks $50_a, 50_b, 50_c \ldots 50_y, 50_z$ and associating each data block with a key value $52_a, 52_b, 52_c \ldots 52_y, 52_z$. It is noted that the last block of data may include less than n-bytes, and thus is indicated as having x-bytes. Once the reference file is separated into the data blocks 50, the key value 52 of each block may be computed using a number of methods. In a first exemplary embodiment, each key is computed by adding the value of each byte of data in the block to produce a total of all of the bytes in the block. By way of background, each 8-bit character in any given block is representative of an ASCII value that ranges from 0 to 255, i.e., $2^8-1$. ASCII is an acronym for the American Standard Code for Information Interchange, a coding scheme that assigns numeric values to letters, numbers, punctuation marks, and certain other characters. Through the standardization of values used for such characters, ASCII enables computers and computer programs to exchange information. Calculating the keys as described above will produce a whole number between zero and $n^2$ that is representative of the data contained in any given block.

Once the keys for each block of data in the reference file have been computed, the keys are sent as an array to the sending computer for comparison to the source file.

FIG. 3 is a pictorial representation of steps (3)–(5). In step (3), a current n-byte block of data from the source file is identified and a value for a source key associated with the current block of data is computed. Thus, in the first comparison bytes zero through (n–1) are identified as the current block of data. Thereafter, the key value of the current block of data is computed using the same method that was used to compute the keys in the reference file. The key value for the current block of data is labeled KEY1.

In step (4), the value of KEY1 is compared to each of the keys in the reference file to determine whether a match has been found, thereby indicating that the current block of data is identical to a block of data in the reference file. If a match is found, an indication of such is sent to the receiving computer. Assuming a match has not been found, according to step (5) the first byte in the current block (byte zero) is sent to the receiving computer. A subsequent "current" block of data is then evaluated by subtracting the first byte of data (byte zero) from the current block, adding the next sequential byte of data (byte n) to the current block, and recomputing the key value for the subsequent current block. The key value for this block of data is labeled KEY2. Thus, KEY2 will comprise the values of bytes 1 through n. The value of KEY2 is then compared to each of the keys in the key array for the reference file.

Assuming a match is not made, the first byte in the current block (byte 1) is sent to the receiving computer. A third key KEY3 representing the current block of data is then computed by sliding the current block of data one byte to the right, such that KEY3 comprises the values of bytes 2 through (n+1). This will continue until either a match is found between a key value computed from a data block in the source file and a key in the key array for the reference file, or all of the data in the source file has been transmitted. Assuming a match is found, an indication of such is sent to the receiving computer, and a subsequent current block of data is computed from the source file.

It is noted that in the case where a match is not found, the additional time required to transfer a file, in comparison to traditional methods, is negligible despite the sliding window and key computations. This is, in part, due to the fact that the processor can make computations much faster than data can be sent. Further, in a preferred embodiment, the receiving computer is configured to expect that bytes being received are data bytes and are not indicative of a match between two data blocks. In the latter case, an additional "match-indicator" byte is sent ahead of the byte(s) indicating that a match has occurred. Thus, the number of bytes being sent in the case of no matches will generally be approximately the same as if the data were simply transmitted without any opportunity for match checks in accordance with the invention.

Figure 4:
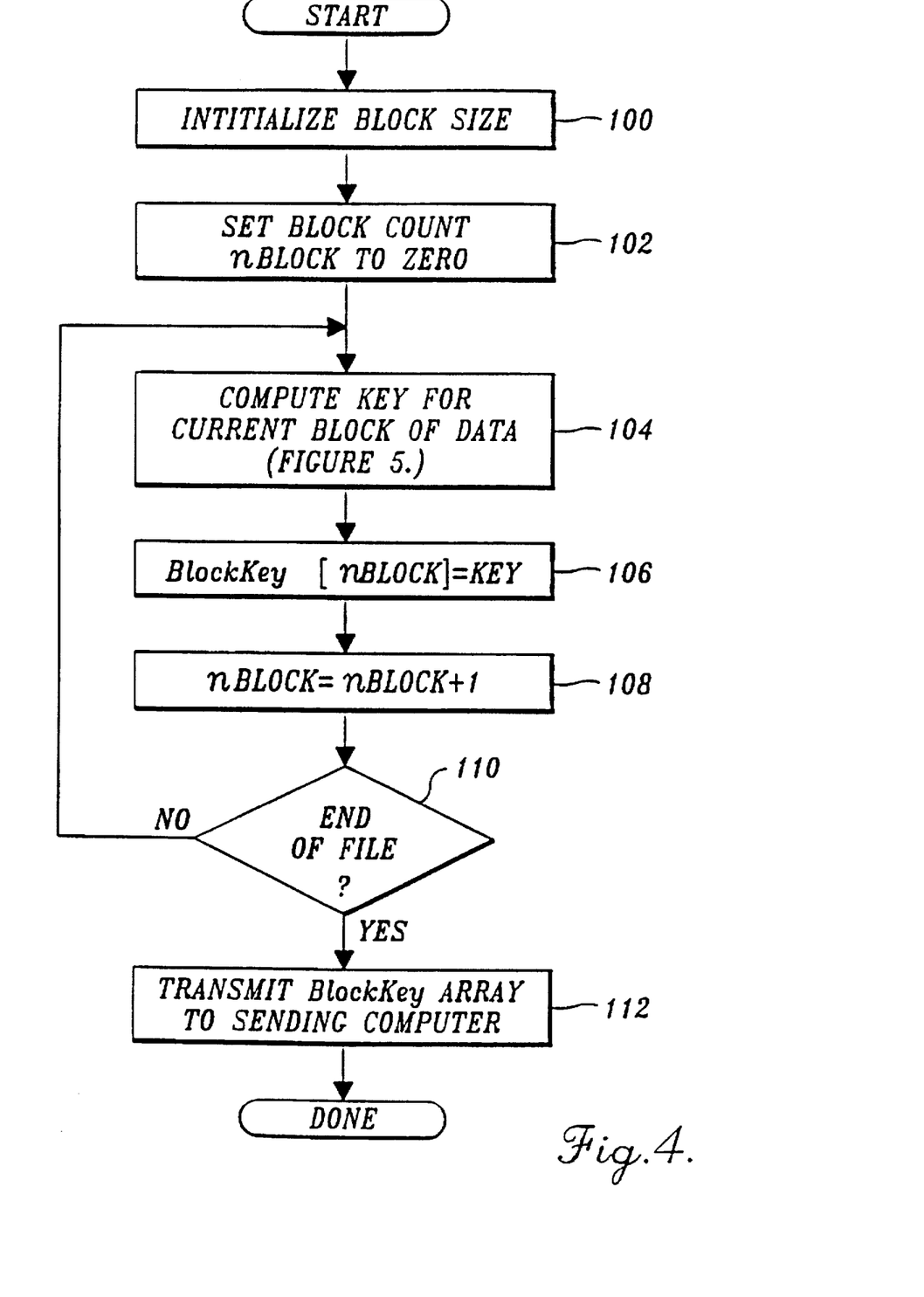
FIG. 4 is a flow diagram of an exemplary routine for implementing a file transfer program in accordance with the invention.
Figure 5:
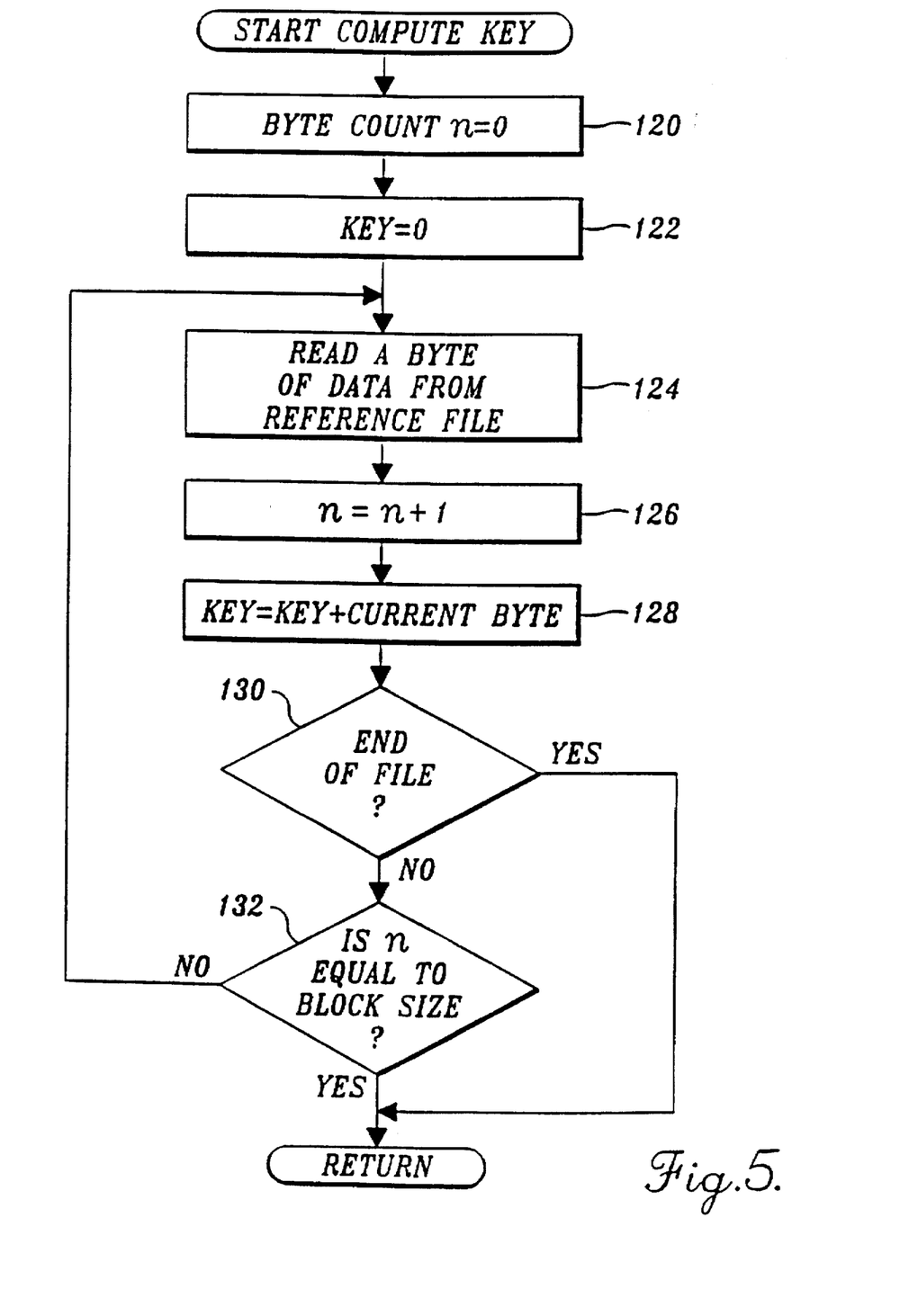
FIG. 5 is a flow diagram of a first exemplary subroutine for determining key values for each block of data in the reference file.

The foregoing is an overview of an exemplary embodiment of the file transfer program 45. Exemplary routines for implementing the file transfer program in software are set forth in FIGS. 4–6 and accompanying text. In that regard, FIG. 4 is a flow diagram of a routine for computing a key array from the contents of the reference file. The size of each block of data is set at block 100. In one embodiment, each block contains 256 bytes. At block 102, the variable nBlock, representing the current block of data being considered by the routine, is set to zero. The value of the key for the current block of data is computed at block 104. A suitable routine for computing the key value is illustrated in FIG. 5. At block 106, the array BlockKey[nBlock] is set equal to the value of the key computed for the current block. The variable nBlock is then incremented at block 108. A test is made at block 110 to determine whether the end of the reference file has been reached. If the end of the file has not been reached, the routine loops back to block 104. If the end of the file has been reached, the BlockKey array is sent to the sending computer at block 112 and the routine terminates.

FIG. 5 is a flow diagram of a first exemplary subroutine suitable for use in FIG. 4 (block 104) for computing the value of the key associated with a given block of data. The subroutine will be called for each data block in the reference file. At block 120, the variable "n," which is representative of the byte count, is set equal to zero. At block 122, the variable "key" is also set equal to zero. A byte of data is then read from the reference file at block 124. Variable n is incremented at block 126. At block 128, the key is set equal to its previous value plus the value of the current byte of data that was read at block 124.

A test is made at block 130 to determine whether the end of the reference file has been reached. If the end of the reference file has not been reached, a test is made at block 132 to determine whether a full block of data has been considered, i.e., whether n is equal to the block size. If n is not equal to the block size, the subroutine loops back to block 124. If n is equal to the block size, or if it was determined at block 130 that the end of the file was reached, the subroutine terminates, and control returns to the routine of FIG. 4.

Figure 6:
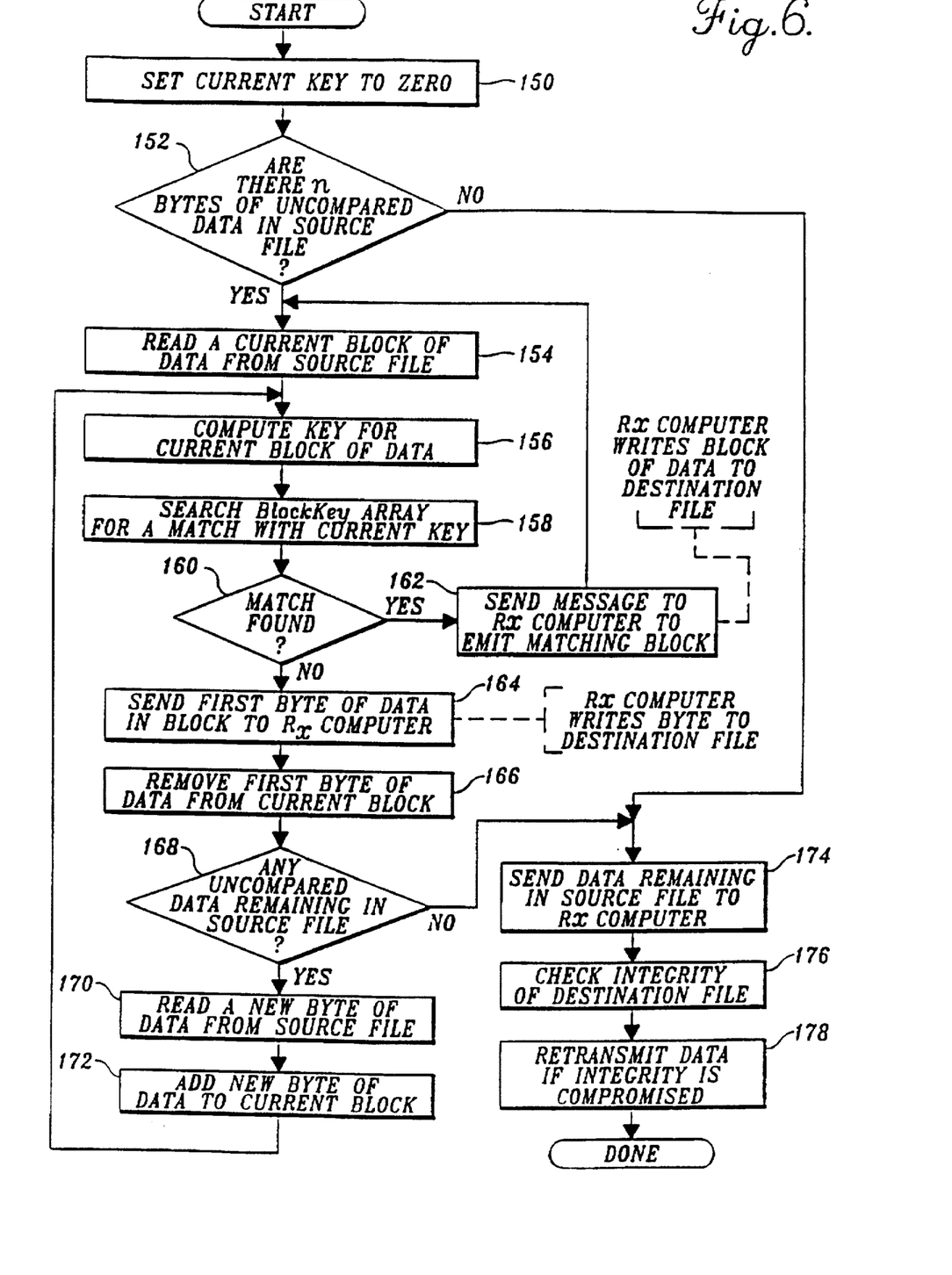
FIG. 6 is a flow diagram of an exemplary routine in accordance with the invention for determining the differences in the source and reference files and transferring those differences to the receiving computer where a destination file is created.

FIG. 6 is a flow diagram of a routine for comparing keys associated with n-byte blocks of data from the source file with the keys computed from the reference file and contained in the BlockKey array. At block 150, the variable "current key" is set equal to zero. A test is made at block 152 to determine whether there is at least n-bytes of data in the source file that have yet to be compared. If there are at least n-bytes of data not yet compared, at block 154 an n-byte block of data is read from the source file. At block 156, the value of the current key, representing the current block of data, is computed using the same computation methods that were used in FIG. 5, i.e., by adding the weighted value of each byte in the current block of data. The key values in the BlockKey array are then searched at block 158 to determine whether any of the keys in the BlockKey array match the current key. The test for whether a match is found is performed at block 160.

If a match was found at block 160, a message is sent at block 162 to the receiving computer to emit the matching block to the destination file. The routine then loops to block 154. If a match was not found, at block 164 a first byte of data in the current block is sent to the receiving computer. At block 166, the byte of data that was sent to the receiving computer is removed from the current block of data. A test is then made at block 168 to determine whether there is any data remaining in the source file that has not been considered. If there is data remaining in the source file, a new byte of data is read from the source file at block 170 and added to the current block of data at block 172. The routine then loops to block 156 where the key for the current block of data is computed.

Those skilled in the art will appreciate that, in computing the current key in block 156 after looping from block 172, it is more efficient to obtain the value of the key for the current block by subtracting from the previously-computed current key the value of the byte that was removed from the current block (in block 166) and then adding the value of the byte that was added to the current block (in block 172), rather than performing the key calculation by adding every character in the current block.

If all of the data remaining in the source file has been considered, or if there were less than n-bytes of data remaining in the source file as determined in the test at block 152, the data remaining in the source file is sent to the receiving computer at block 174. At the receiving computer, the transmitted data is added to the destination file and the file transfer is complete. In an alternative embodiment, instead of simply sending the data remaining as indicated in block 174, a test is made to determine if the key value of the data remaining matches the key value of the last block of data in the reference file. If a match is present, an indication of the match is sent to the receiving computer, and the data itself need not be transmitted. Otherwise, the actual data is transmitted. This will result in a further optimization of the transfer in situations where the end of the reference file contains the same data as the end of the source file.

Once all of the data in the source file has been added to the destination file, i.e., through blocks 162, 164 and 174, the destination file will in most circumstances be an exact copy of the source file. However, it is preferable that a check be made to ensure that the destination file is indeed a precise duplicate of the source file. In block 176, the integrity of the destination file is checked using means known to those skilled in the art. One method of checking the file integrity is a cyclic redundancy-check (CRC), such as that set forth in M. Nelson, *The Data Compression Book*, 446–448 (M&T Books 1991), which is hereby incorporated by reference. If the integrity of the destination file was compromised, the data from the source file is retransmitted to the destination file using conventional transmission methods. This is indicated at block 178. If the integrity of the destination file tested positive, or upon transmitting the source file, the routine terminates.

One circumstance where the destination file may not be an accurate copy of the source file is where two or more different blocks of data yield the same key value. If it is assumed that each block of data is 256 bytes, under the key computation method described in FIG. 5, the range of possible key values is 0 to 65,280, the latter value occurring only if each byte in the block has a numerical value of 255. The odds of having duplicate keys are significantly decreased if: (1) the range of possible key values is relatively large, and/or (2) the likelihood that key computations will fall within a broader portion of the range is increased. In light of the above, it will be appreciated that the accuracy of the data file transfer method for transmitting data in accordance with the invention will work most effectively if the possibility of having two different blocks of data having the same key value is extremely remote.

Another desirable feature of an advantageous key computation method is if the current key values for blocks of source data that are derived on a sliding window basis can be quickly established. One way of accomplishing this is to have a key computation method that allows the current key to be updated by subtracting the key value associated with the byte of data to be subtracted from the current block of data (block 166) and adding the key value associated with the byte of data to be added to the current block (block 172).

While the key computation method described in FIG. 5 has this desirable feature, it may not work well for larger files because of its limited range of possible key values and the distribution of values within this range.

Figure 7A:
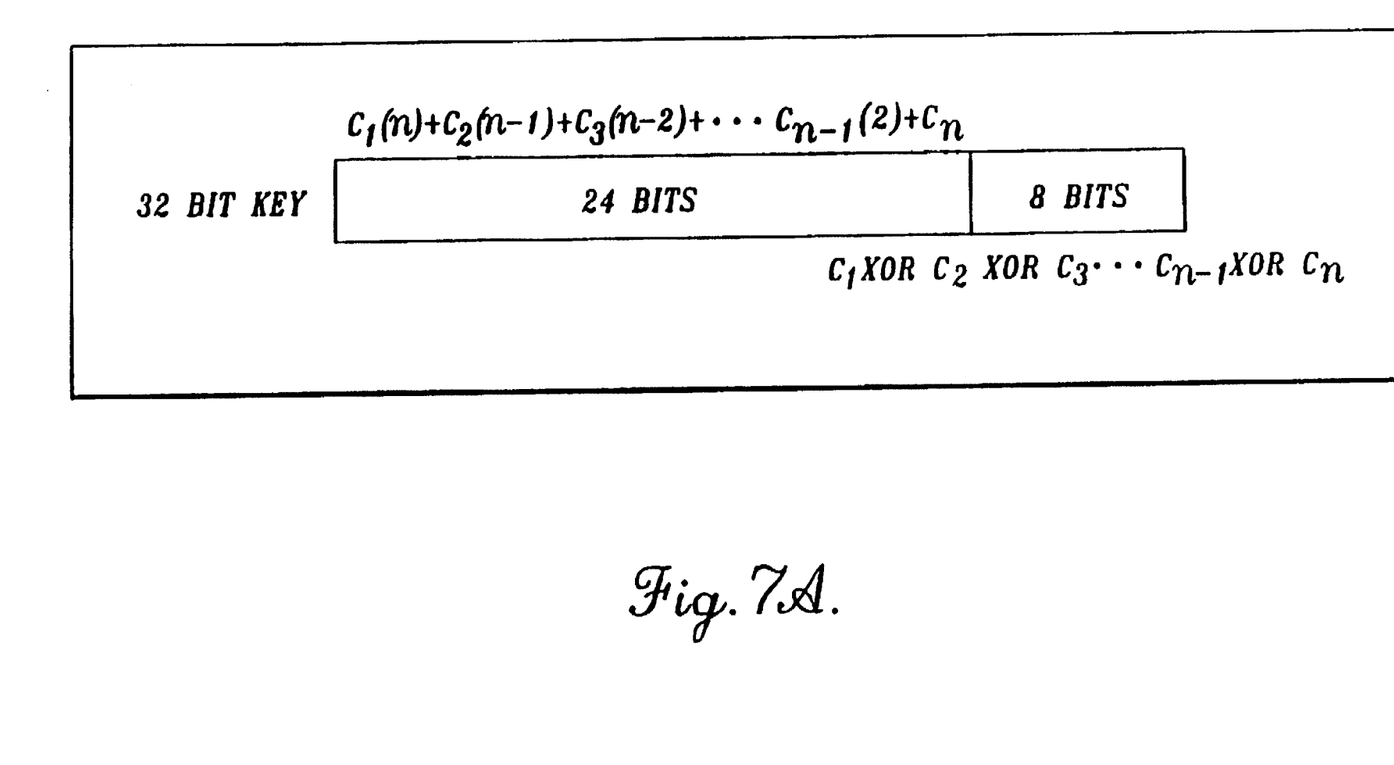
FIG. 7A illustrates a second exemplary method of determining key values for each block of data in the reference file.
Figure 7B:
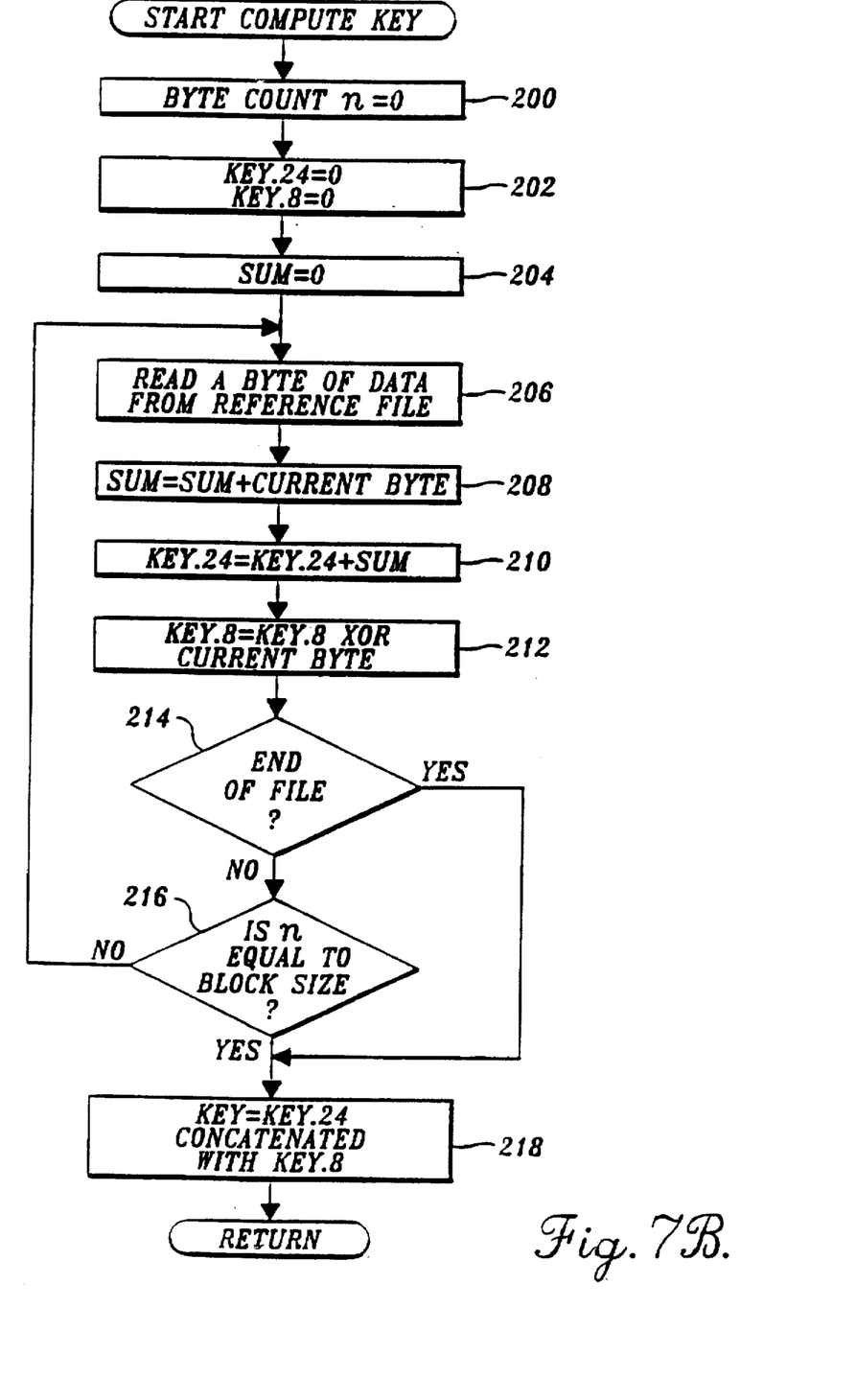
FIG. 7B is a flow diagram of a subroutine for implementing the method determining key values shown in FIG. 7A.
Figure 7C:
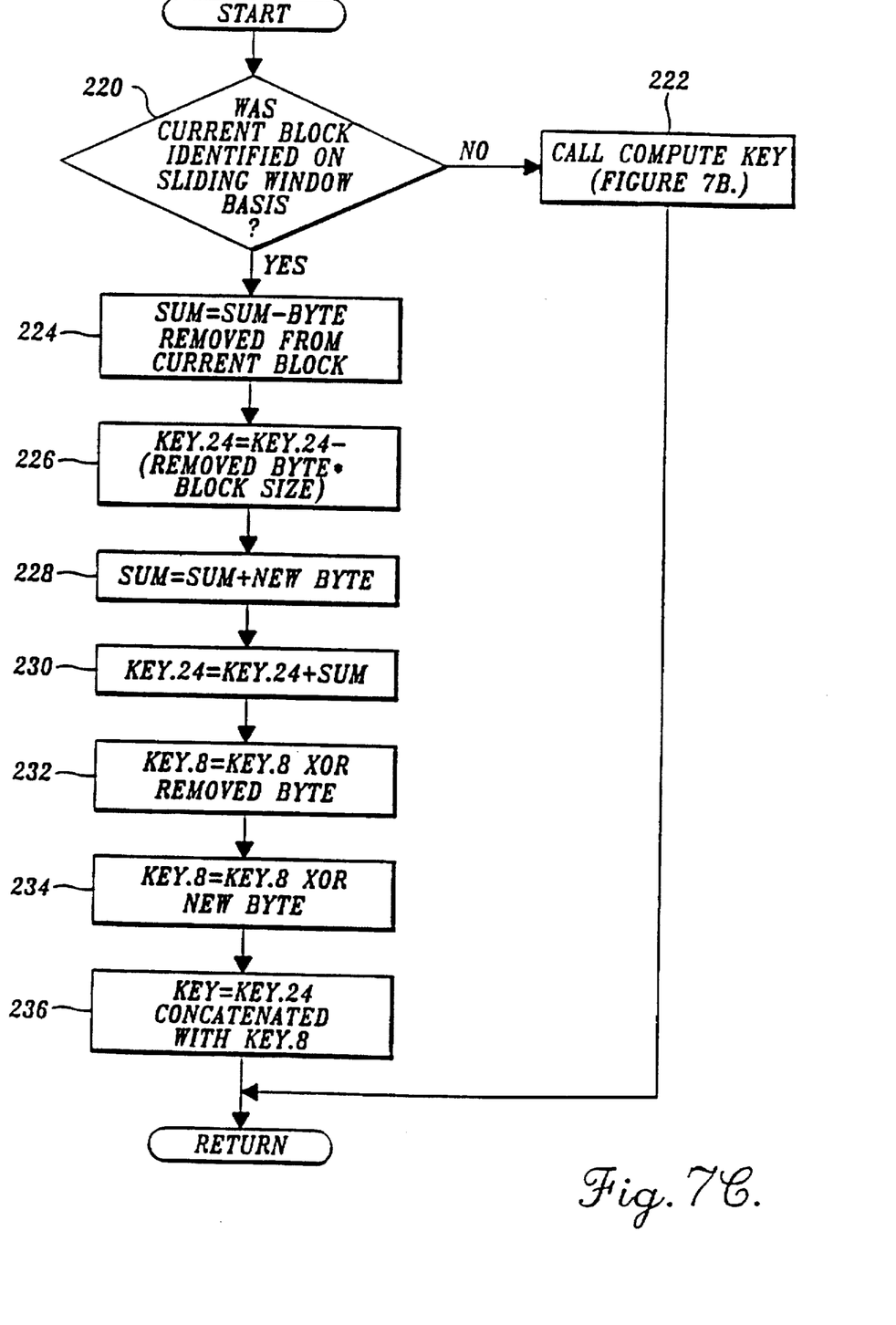
FIG. 7C is a flow diagram of a subroutine for determining the value of a key associated with a current block of data in the source file.

FIGS. 7A–7C illustrate a second exemplary embodiment for calculating keys in accordance with the invention in which the range of possible key values is extended beyond the summing scheme of FIG. 5, thereby decreasing the likelihood that any key value will be representative of more than a single block of data. Further, the calculation method allows the current key to be updated very quickly, as described in FIG. 7C and accompanying text. The examples of FIGS. 7A–7C illustrate a 32-bit key, but it will be appreciated that other key sizes may be implemented.

With reference to FIG. 7A, the 32-bit key is divided into a lower 24-bit segment and an upper 8-bit segment. The 24-bit segment is computed using the following equation:

$$C_1(n) + C_2(n-1) + C_3(n-2) + \ldots C_{n-1}(2) + C_n \quad (1)$$

where $C_i$ is the character in the ith position of a current block and n is the number of bytes in each block. The upper 8-bits of the 32-bit key are calculated by performing an exclusive OR operation (XOR) on each of the characters, as shown by the equation:

$$C_1 \text{ XOR } C_2 \text{ XOR } C_3 \ldots C_{n-1} \text{ XOR } C_n \quad (2)$$

Once the lower and upper key values are calculated, the bits are concatenated to form each 32-bit key.

FIG. 7B illustrates a suitable subroutine for implementing the key calculations illustrated in FIG. 7A. The subroutine is called by the routine of FIG. 4 in lieu of calling the subroutine of FIG. 5. At block 200, the variable "n," which is indicative of the byte count for any given block, is set equal to zero. At block 202, the lower and upper portions of the key, i.e., key.24 and key.8, are set equal to zero. The variable "sum" is set equal to zero at block 204. At block 206, a byte of data is read from the reference file.

At block 208, the value of the current byte is added to the variable sum. The key.24 variable is then increased by the value of sum at block 210. It will be appreciated that blocks 208 and 210 are alternate methods of computing equation (1) without requiring multiplication operations. At block 212, the variable key.8 is set equal to the previous value of key.8 XOR the current byte.

A test is made at block 214 to determine if the end of the reference file has been reached. If the end of the reference file has not been reached, a test is made at block 216 to determine whether n is equal to the block size. If n is not equal to the block size, the routine loops to block 206. If n is equal to the block size, or if the end of the file has been reached, the variable "key" is set by concatenating the lower 24-bit (key.24) value computed at block 210 with the upper 8-bit (key.8) value computed at block 212. The subroutine then terminates, and the program returns to block 106 of FIG. 4.

FIG. 7C illustrates a suitable subroutine that may be called from block 156 of FIG. 6 to compute the value of the current key for a current block of data. The subroutine illustrates the optimization of key calculations for those blocks of source data that are identified on a sliding window basis, and thus have key values similar to a key that has already been computed. A test is made at block 220 to determine if the current block was identified on a sliding window basis, or in other words, if the subroutine was called because a match with the previous block was not found. If the current block of data was not identified on this basis, the subroutine of FIG. 7B to compute the value of the current key. This occurs at the first block of data in the source file or after a match was found.

If the current block of data was identified on the basis of a previous, unmatched block of data, the first byte from the previous block (termed the removed byte from the operation of block 166) is subtracted from sum at block 224. At block 226, the key.24 is set equal to its previous value less the product of the block size times the value of the removed byte. At block 228, the new byte (added to the current block in block 172) is added to sum. The key.24 variable is then increased by the value of sum at block 230.

At block 232, the variable key.8 is set equal to the previous value of key.8 XOR the removed byte. An exclusive OR operation is then performed between key.8 the new byte. At block 236 the variable "key" is set by concatenating the lower 24-bit (key.24) value computed at block 230 with the upper 8-bit (key.8) value computed at block 234. The subroutine then terminates, and control returns to block 158 of FIG. 6. As can be seen, the subroutine of FIG. 7C allows key values to be quickly computed, thus allowing faster operation of the file transfer program when looking for matches between blocks from the source file and blocks from the reference file.

As will be appreciated by those skilled in the art, a large number of different key computation methods may be used in accordance with the invention. Thus, the invention is not to be limited by exemplary key calculations illustrated herein. Any key computation that is not unnecessarily time-consuming computationally and that provides a relatively wide range of results may be beneficial. Moreover, the type of key computation used in any particular embodiment may depend upon the block size to achieve optimal results. Another key computation that may be used is to multiply each character in a block by its position in the block, and summing the results of the multiplication operations. Another key computation that may be implemented is the CRC file integrity check discussed above. Although this method is extremely accurate, it may be too slow for many applications.

With reference again to FIG. 6, it is noted that further optimization may be achieved when searching the BlockKey array (block 158) by utilizing a binary search. A binary search is a type of search in which an item that may be present within an ordered list is found by repeatedly dividing the ordered list into two equal parts and searching the half that may contain the item. Because a binary search requires the searching list to be in a known sequence, e.g., ascending order, the BlockKey array would need to be arranged accordingly in order for the search to be effective. A suitable standard binary search is set forth in H. Schildt, *The Complete C Reference*, 487–488 (Osborn McGraw-Hill 1987), which is hereby incorporated by reference.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of transmitting data from a source file located at a sending computer to a receiving computer, the computers being connected through a computer data interface, the method comprising the steps of:

(a) dividing a reference file located at the receiving computer into a plurality of data blocks, each data block having a length of n bytes, and associating each data block with a reference key value determined in accordance with a key defining method by the data in that block;

(b) transmitting the reference key values to the sending computer;

(c) identifying blocks of data of length n bytes from the source file, determining source key values in accordance with the key defining method, and using the source and reference key values to compare blocks of data from the reference file to blocks of data from the source file and, in instances where a match is found between a block of data from each file, sending an indication of the match to the receiving computer so that the block of data indicated by the match need not be transmitted to the receiving computer.

2. The method of claim 1 wherein an initial block of data is identified from the source file, a source key is determined from the initial block, and if a match for the initial block is not found;

the method further including the step of transmitting a subset of the initial block to the receiving computer, the subset including less than all of the information in the initial block; and identifying blocks of data of length n bytes from the source file includes identifying from the source file a subsequent block of data of length n bytes comprising the initial block of data, less the transmitted subset, and additional data from the source file.

3. The method of claim 1 wherein at least a portion of the key value for a block of data is computed by adding the value of each byte of data in the block to produce a total of all of the bytes in the block.

4. The method of claim 1 wherein at least a portion of the key value for a block of data is computed by multiplying the bytes in the block by one or more multipliers, the value of the multiplier being dependent upon the position of a given byte in the block, and summing the results of the multiplication operations.

5. A method of transmitting data from a source file located at a sending computer to a destination file located at a receiving computer, the computers being connected through a computer data interface, the method comprising the steps of:

(a) identifying a reference file at the receiving computer that may have data identical to some of the data comprising the source file;

(b) dividing the data comprising the reference file into a plurality of data blocks having n-bytes per block and associating each data block with a reference key value determined by a key defining method;

(c) identifying an n-byte block of data from the source file and computing using the key defining method a current value for a source key associated with the identified block of data;

(d) comparing the current value of the source key with each of the reference key values and, if a match is found, (i) transferring an indication of such to the receiving computer, and (ii) repeating step (c); and (e) if a match was not found in step (d), transferring to the receiving computer a subset including less than all the data in the n-byte block of data, removing the subset from the n-byte block of data, adding additional data from the source file to the n-byte block of data, re-computing using the key defining method a current value of the source key, and repeating step (d).

6. The method of claim 5, wherein steps (c) and (d) are repeated only until all of the data in the source file has been considered.

7. The method of claim 5 wherein recomputing a current value of the source key of step (e) includes deriving at least a part of the current value of the source key from at least a part of the previous source key by removing the contribution to the part of the source key from the transmitted subset and integrating into the part of source key a contribution from the additional data.

8. The method of claim 1 wherein each byte of data in the reference file is used in the determination of not more than one reference key, and in which at least some of the bytes of data in the source file are used in the determination of multiple source keys.

9. The method of claim 2 in which the source key and the reference key include multiple bits and in which some of the bits are determined by a summing operation and some of the bits are determined by a logical operation.

10. The method of claim 9 in which the summing operation includes multiplying by constant coefficients the values represented by bytes of the blocks of source data and in which the logical operation comprises an exclusive OR operation.

11. The method of claim 2 wherein the key defining method for the blocks of data includes the following calculation:

$$C_1(n)+C_2(n-1)+C_3(n-2)+\ldots+C_{n-1}(2)+C_n$$

where $C_n$ is the character in the nth position of the block of data.

12. The method of claim 11 wherein the key defining method includes the following logical operation:

$$C_1 \text{ XOR } C_2 \text{ XOR } C_3 \ldots C_{n-1} \text{ XOR } C_n.$$

13. A method of changing data at a receiving unit until the data at the receiving unit is identical to data at a source unit, comprising:
(a) determining multiple reference keys corresponding to groups of data stored at the receiving unit;
(b) transmitting the multiple reference keys to the source unit;
(c) determining a source key corresponding to a group of source data in the source unit;
(d) comparing the source key with the multiple reference keys;
(e) transmitting data from the source unit to the receiving unit if the source key does not match any of the reference keys;
(f) transmitting a control signal from the source unit to the receiving unit if the source key matches a reference key, the control signal causing the receiving unit to use data at the receiving unit corresponding to the matched reference key; and
(g) repeating steps (c), (d), (e), and (f) for additional groups of source data in the source unit until the data at the receiving unit is identical to the data at the source unit.

14. The method of claim 13 wherein the data transmitted is a subset of the group of source data associated with the matching source key, the subset including less than all of the information in the initial block.

15. The method of claim 13 wherein each byte of data in the reference file is used in the determination of not more than one reference key, and in which at least some of the bytes of data in the source file are used in the determination of multiple source keys.

16. An apparatus for changing data at a receiving unit until the data at the receiving unit is identical to data at a source unit, comprising:
means for determining an array of reference keys corresponding to groups of data stored at the receiving unit;
data transfer means for transmitting the multiple reference keys to the source unit;
means for determining source keys corresponding to groups of source data in the source unit;
means for comparing the source keys with the multiple reference keys;
means for transmitting data from the source unit to the receiving unit when a source key does not match any of the reference keys; and
means for transmitting a control signal from the source unit to the receiving unit when a source key matches a reference key, the control signal causing the receiving unit to use a group of data at the receiving unit corresponding to the matched reference key.

17. The apparatus of claim 16 wherein the means for determining source keys determines a new source key after the means for comparing source keys has compared the previously determined source key, and wherein the means for determining source keys determines the new source key from a group of source data, the composition of the which is determined by whether the previously compared source key matched a reference key.

18. A method of creating at a receiving computer a duplicate file that is identical to a source file at a sending computer, the duplicate file being formed in part from data in a reference file located at the remote computer and in part from data in the source file transmitted from the sending computer, the computers being connected through a computer data interface, the method comprising the steps of:
(a) dividing the reference file located at the receiving computer into a plurality of data blocks of uniform length and associating with each data block a reference key value determined by the data in that block in accordance with a key defining method; and
(b) identifying blocks of data of the uniform length from the source file, determining source key values in accordance with the key defining method, and comparing the source and reference key values to determine whether blocks of data from the reference file match blocks of data from the source file and, in instances where a match is found between a block of data from each file, sending an indication to the receiving computer to copy the block of data from the reference file into the duplicate file so that the block of data indicated by the match need not be transmitted to the receiving computer, wherein the blocks of data from the source file are sequentially identified and each source block of data includes some of the data from the preceding source block of data if the preceding source block of data did not match a reference block of data.

19. The method of claim 18 in which the uniform length of the data blocks is at least 256 bytes.

20. The method of claim 18 in which the key defining method defines keys that are at least 32 bits in length.

21. A method of creating at a receiving computer a duplicate file that is identical to a source file at a sending computer, the duplicate file being formed in part from data in a reference file located at the remote computer and in part from data in the source file transmitted from the sending computer, the computers being connected through a computer data interface, the method comprising the steps of:

(a) dividing the reference file located at the receiving computer into a plurality of data blocks of uniform length and associating each data block with a reference key value determined by the data in that block in accordance with a key defining method;

(b) identifying blocks of data of the uniform length from the source file, determining source key values in accordance with the key defining method, and using the source and reference key values to compare blocks of data from the reference file with blocks of data from the source file;

(c) in instances where a match is found between a block of data from each file, sending an indication of the match to the receiving computer to copy the block of data from the reference file to the duplicate file so that the block of data indicated by the match need not be transmitted to the receiving computer; and (d) in instances where a match is not found between a block of data from each file, transmitting less bytes than the number of bytes in the uniform length from the source file to the receiving computer and adding transmitted bytes to the duplicate file.

22. A method of creating at a receiving computer a duplicate file that is identical to a source file at a sending computer, the duplicate file being formed in part from data in a reference file located at the remote computer and in part from data in the source file transmitted from the sending computer, the computers being connected through a computer data interface, the method comprising the steps of:

(a) dividing the reference file located at the receiving computer into a plurality of data blocks, each data block having a length of n bytes, and associating each data block with a reference key value determined by the data in that block in accordance with a key defining method;

(b) identifying blocks of data of length n bytes from the source file, determining source key values in accordance with the key defining method, and using the source and reference key values to compare blocks of data from the source file with blocks of data from the reference file to find a match;

(c) in instances where a match is found between a block of data from each file, sending an indication of the match to the receiving computer to copy the block of data from the reference file to the duplicate file so that the block of data indicated by the match need not be transmitted from the source computer to the receiving computer; and (d) in instances where a match is not found:
  (i) transmitting a subset of the initial block to the receiving computer and adding the subset to the duplicate file;
  (ii) identifying from the source file a subsequent block of data of length n bytes comprising the initial block of data, less the transmitted subset, and additional data from the source file; and
  (iii) determining for the subsequent block of data a source key, the source key being derived from the source key determined from the initial block of data by removing the contribution from the transmitted subset and incorporating a contribution from the additional data.

23. The method of claim 13 wherein if the preceding source key did not match a reference key, the subsequent source key is determined from a group of source data that includes some but not all of the data in the preceding group of source data and also includes data not included in the preceding group of source data and, if the preceding source key did match a reference key, the source key corresponds to a block of source data that directly follows the data used to determine the previous source key.

24. A method of changing data at a receiving unit until the data at the receiving unit is identical to data at a source unit, comprising:

(a) determining using a key defining method multiple reference keys corresponding to data groups of length n bytes stored at the receiving unit;

(b) transmitting the multiple reference keys to the source unit;

(c) determining using the key determining method a source key corresponding to a group of source data of length n bytes in the source unit;

(d) comparing the source key with the multiple reference keys;

(e) transmitting data from the source unit to the receiving unit if the source key does not match any of the reference keys;

(f) transmitting a control signal from the source unit to the receiving unit if the source key matches a reference key, the control signal causing the receiving unit to use data at the receiving unit corresponding to the matched reference key; and (g) repeating steps (c), (d), (e), and (f) for additional groups of source data in the source unit until the data at the receiving unit is identical to the data at the source unit, wherein the groups of source data comprise, if the preceding source key did not match a reference key, n−1 bytes from the first group of data and one additional byte of data, and if the preceding source key did match a reference key, n bytes of data different from the n bytes of the preceding source group of data.

25. An apparatus for changing data at a receiving unit so that the data at the receiving unit is identical to data at a source unit, comprising:

means for determining using a key defining method an array of reference keys having lengths of corresponding to data groups having a uniform length of at 256 bytes and stored at the receiving unit;

data transfer means for transmitting the multiple reference keys to the source unit;

means for determining using the key defining method source keys corresponding to groups of source data of the uniform length in the source unit;

means for comparing the source keys with the multiple reference keys;

means for transmitting, when a source key does not match any of the reference keys, less than all the data that is included in the group of source data used to determine the source key; and means for transmitting a control signal from the source unit to the receiving unit when a source key matches a reference key, the control signal causing the receiving unit to use a group of data at the receiving unit corresponding to the matched reference key.

26. A method of creating at a receiving computer a duplicate file that is identical to a source file at a sending computer, the duplicate file being formed in part from data in a reference file located at the receiving computer and in part from data in the source file transmitted from the sending computer, the computers being connected through a computer data interface, the method comprising the steps of:

(a) identifying a reference file at the receiving computer that may have data identical to the data comprising the source file;

(b) dividing the data comprising the reference file into a plurality of data blocks having n-bytes per block and associating each data block with a reference key value determined by a key defining method;

(c) transmitting the reference key values from the receiving computer to the sending computer;

(d) identifying an n-byte block of data from the source file and computing using the key defining method a current value for a source key associated with the identified block of data;

(e) comparing the current value of the source key with each of the reference key values and, if a match is found, (i) transmitting an indication of such to the receiving computer, which adds the matching data from the reference file to the duplicate file, and (ii) repeating step (d); and (f) if a match was not found in step (e), transferring to the receiving computer a subset of the n-byte block of data to be added to the duplicate file and repeating step (d).

27. The method of claim 26 in which, if a match was not found in step (d), a new block of data in the source file is defined by removing the transmitted subset from the previous n-byte block of data, adding additional data from the source file to the new n-byte block of data, re-computing using the key defining method a current value of the source key, and repeating step (e).

28. The method of claim 26 in which, if a match is found in step (d), a new block of data in the source file is defined by the n bytes immediately following the n-bytes used to form the previous source block of data.

29. The method of claim 26 in which the reference keys comprise and first part and a second part, the calculation of each part being independent of the calculation of the other part.

30. The method of claim 26 in which the uniform length of the data blocks is at least 256 bytes.

31. The method of claim 26 in which the key defining method defines keys that are at least 32 bits in length.

32. A method of making creating a first data file at a first location that is identical to a source data file at a second location, the method comprising the steps of:

(a) identifying a reference file at the first location that may have data identical to the data comprising source data file;

(b) dividing the data comprising the reference file into a plurality of data blocks having n-bytes per block and associating each data block with a reference key value determined by a key defining method;

(c) transmitting the reference key values from the first location to the second location;

(d) identifying an n-byte block of data from the source file and computing using the key defining method a current value for a source key associated with the identified block of data;

(e) comparing the current value of the source key with each of the reference key values and, if a match is found, (i) transferring an indication of such to the receiving computer, which adds the matching data from the reference file to the duplicate file, and (ii) repeating step (d); and (f) if a match was not found in step (e), transferring to the receiving computer a subset of the n-byte block of data to be added to the duplicate file and repeating step (d).

* * * * *